US010551014B2

(12) United States Patent
Selevan et al.

(10) Patent No.: US 10,551,014 B2
(45) Date of Patent: Feb. 4, 2020

(54) PORTABLE ELECTRONIC FLARE CARRYING CASE AND SYSTEM

(71) Applicants: James R. Selevan, Laguna Beach, CA (US); Daniel Joseph Selevan, Laguna Beach, CA (US)

(72) Inventors: James R. Selevan, Laguna Beach, CA (US); Daniel Joseph Selevan, Laguna Beach, CA (US)

(*) Notice: Subject to any disclaimer, the term of this patent is extended or adjusted under 35 U.S.C. 154(b) by 0 days.

(21) Appl. No.: 15/893,420

(22) Filed: Feb. 9, 2018

(65) Prior Publication Data

US 2019/0154214 A1 May 23, 2019

Related U.S. Application Data

(63) Continuation-in-part of application No. 29/613,191, filed on Aug. 8, 2017, and a continuation-in-part of application No. 29/593,694, filed on Feb. 10, 2017.

(60) Provisional application No. 62/457,639, filed on Feb. 10, 2017.

(51) Int. Cl.

| *F21L 4/08* | (2006.01) |
|---|---|
| *B65D 25/20* | (2006.01) |
| *B65D 25/30* | (2006.01) |
| *H02J 7/00* | (2006.01) |
| *F21L 2/00* | (2006.01) |
| *F21V 23/04* | (2006.01) |
| *F21Y 115/10* | (2016.01) |

(52) U.S. Cl.
CPC ............... *F21L 4/08* (2013.01); *B65D 25/20* (2013.01); *B65D 25/30* (2013.01); *F21L 2/00* (2013.01); *F21V 23/0435* (2013.01); *H02J 7/0027* (2013.01); *H02J 7/0044* (2013.01); *F21Y 2115/10* (2016.08)

(58) Field of Classification Search
CPC .... B60Q 1/52; B60Q 1/26; B60Q 7/00; F21L 4/08; F21L 2/00; B65D 25/20; B65D 25/30; F21V 23/0435; H02J 7/0027; H02J 7/0044; F21Y 2115/10
See application file for complete search history.

(56) References Cited

U.S. PATENT DOCUMENTS

| 3,500,378 A | 3/1970 | Pickering et al. |
|---|---|---|
| 3,787,867 A | 1/1974 | Dodge et al. |
| 3,846,672 A | 11/1974 | Doughty |
| 4,132,983 A | 1/1979 | Shapiro |
| 4,249,159 A | 2/1981 | Stasko |
| 4,345,305 A | 8/1982 | Kolm et al. |
| 4,827,245 A | 5/1989 | Lipman |

(Continued)

FOREIGN PATENT DOCUMENTS

| WO | WO 2014/130842 A1 | 8/2014 |
|---|---|---|
| WO | WO 2016/070193 A1 | 5/2016 |

OTHER PUBLICATIONS

Finley, M.D. et al., "Sequential Warning Light System for Work Zone Lane Closures," Texas Transportation System, (2011) pp. 1-23.

(Continued)

*Primary Examiner* — Mary Ellen Bowman
(74) *Attorney, Agent, or Firm* — Robert D. Buyan; Stout, Uxa & Buyan, LLP

(57) ABSTRACT

Carrying cases for electronic flares or other electronic signal emitting devices and related systems and methods.

21 Claims, 14 Drawing Sheets

(56) References Cited

U.S. PATENT DOCUMENTS

| | | | |
|---|---|---|---|
| 4,841,278 A | 6/1989 | Tezuka et al. | |
| 5,294,924 A | 3/1994 | Dydzyk | |
| 5,345,232 A | 9/1994 | Robertson | |
| 5,438,495 A | 8/1995 | Ahlen et al. | |
| 5,673,039 A | 9/1997 | Pietzsch et al. | |
| 5,754,124 A | 5/1998 | Daggett et al. | |
| 6,299,379 B1 | 10/2001 | Lewis | |
| 6,332,077 B1 | 12/2001 | Wu et al. | |
| 6,486,797 B1 | 11/2002 | Laidman | |
| 6,549,121 B2 | 4/2003 | Povey et al. | |
| 6,614,358 B1 | 9/2003 | Hutchison et al. | |
| D498,164 S | 11/2004 | Delich | |
| 6,929,378 B2 | 8/2005 | Wang | |
| D510,289 S | 10/2005 | Dueker et al. | |
| 6,963,275 B2 | 11/2005 | Smalls | |
| D515,957 S | 2/2006 | Dueker et al. | |
| D515,958 S | 2/2006 | Dueker et al. | |
| 7,088,222 B1 | 8/2006 | Dueker et al. | |
| 7,106,179 B1 * | 9/2006 | Dueker | B60Q 1/52 340/321 |
| 7,182,479 B1 | 2/2007 | Flood et al. | |
| 7,277,809 B1 | 10/2007 | DeWitt, Jr. et al. | |
| 7,298,244 B1 | 11/2007 | Cress et al. | |
| 7,301,469 B1 | 11/2007 | Hoffman et al. | |
| D560,533 S | 1/2008 | Dueker et al. | |
| D564,387 S | 3/2008 | Rubin et al. | |
| 7,455,419 B2 | 11/2008 | Helget et al. | |
| 7,563,158 B2 | 7/2009 | Haschke et al. | |
| D631,582 S | 1/2011 | Hwang | |
| 8,072,345 B2 | 12/2011 | Gallo | |
| D654,387 S | 2/2012 | Wilson et al. | |
| 8,154,424 B2 | 4/2012 | Selevan | |
| 8,220,950 B1 | 7/2012 | Sunshine | |
| D669,805 S | 10/2012 | Edwards et al. | |
| D678,100 S | 3/2013 | Hwang | |
| 8,550,653 B2 | 10/2013 | Wilson et al. | |
| 8,564,456 B2 | 10/2013 | Selevan | |
| 8,579,460 B2 | 11/2013 | Wilson et al. | |
| 8,602,584 B2 | 12/2013 | Ghafoori et al. | |
| 8,643,511 B1 | 2/2014 | Batterson | |
| 8,786,461 B1 | 7/2014 | Daudelin | |
| 8,949,022 B1 | 2/2015 | Fahrner | |
| 9,066,383 B2 | 6/2015 | Gerszberg | |
| 9,288,088 B1 | 3/2016 | McIlroy | |
| 9,437,109 B1 | 9/2016 | Stafford et al. | |
| 9,489,809 B1 | 11/2016 | Dever et al. | |
| D778,752 S | 2/2017 | Selevan | |
| D778,753 S | 2/2017 | Selevan | |
| 9,835,319 B2 | 12/2017 | Selevan et al. | |
| 2002/0036908 A1 | 3/2002 | Pederson | |
| 2002/0067290 A1 | 6/2002 | Peet, II et al. | |
| 2002/0154787 A1 | 10/2002 | Rice et al. | |
| 2002/0159251 A1 | 10/2002 | Hart | |
| 2002/0164666 A1 | 11/2002 | Cimbora et al. | |
| 2002/0175831 A1 | 11/2002 | Bergan et al. | |
| 2004/0056779 A1 | 3/2004 | Rast | |
| 2004/0100396 A1 | 5/2004 | Antico et al. | |
| 2004/0113817 A1 | 6/2004 | Novak et al. | |
| 2004/0124993 A1 | 7/2004 | George | |
| 2004/0183694 A1 | 9/2004 | Bauer | |
| 2005/0040970 A1 | 2/2005 | Hutchins et al. | |
| 2005/0210722 A1 | 9/2005 | Graef et al. | |
| 2005/0248299 A1 | 11/2005 | Chemel et al. | |
| 2006/0072306 A1 | 4/2006 | Woodyard | |
| 2006/0104054 A1 | 5/2006 | Coman | |
| 2006/0165025 A1 | 7/2006 | Singh et al. | |
| 2007/0038743 A1 | 2/2007 | Hellhake et al. | |
| 2007/0099625 A1 | 5/2007 | Rosenfeld | |
| 2007/0115139 A1 | 5/2007 | Witte et al. | |
| 2007/0153520 A1 | 7/2007 | Curran et al. | |
| 2007/0155139 A1 | 7/2007 | Hecht et al. | |
| 2007/0194906 A1 | 8/2007 | Sink | |
| 2007/0222640 A1 | 9/2007 | Guelzow et al. | |
| 2007/0273509 A1 | 11/2007 | Gananathan | |
| 2008/0037431 A1 | 2/2008 | Werb et al. | |
| 2008/0042866 A1 | 2/2008 | Morse et al. | |
| 2008/0091304 A1 | 4/2008 | Ozick et al. | |
| 2008/0122607 A1 | 5/2008 | Bradley | |
| 2008/0242220 A1 | 10/2008 | Wilson et al. | |
| 2008/0267259 A1 | 10/2008 | Budampati et al. | |
| 2009/0034419 A1 | 2/2009 | Flammer, III et al. | |
| 2009/0115336 A1 | 5/2009 | Wang | |
| 2009/0187300 A1 | 7/2009 | Everitt | |
| 2010/0259199 A1 * | 10/2010 | McDermott | B60Q 1/52 315/313 |
| 2011/0249430 A1 * | 10/2011 | Stamatatos | B60Q 1/2615 362/184 |
| 2011/0249688 A1 | 10/2011 | Liu | |
| 2012/0256765 A1 | 10/2012 | Selevan | |
| 2012/0277934 A1 | 11/2012 | Ohtomo et al. | |
| 2012/0287611 A1 * | 11/2012 | Wilson | F21L 2/00 362/183 |
| 2013/0113634 A1 | 5/2013 | Hutchinson et al. | |
| 2013/0221852 A1 | 8/2013 | Bowers et al. | |
| 2013/0260695 A1 | 10/2013 | Wang | |
| 2013/0271294 A1 | 10/2013 | Selevan | |
| 2013/0293396 A1 | 11/2013 | Selevan | |
| 2014/0126187 A1 * | 5/2014 | Bennett | F21L 2/00 362/183 |
| 2014/0210373 A1 | 7/2014 | Baret | |
| 2015/0077234 A1 | 3/2015 | Fullam | |
| 2015/0366275 A1 | 12/2015 | Cserfoi | |
| 2016/0174099 A1 | 6/2016 | Goldfain | |
| 2016/0186971 A1 | 6/2016 | Selevan et al. | |
| 2016/0248506 A1 | 8/2016 | Ryan et al. | |
| 2017/0097128 A1 * | 4/2017 | Stafford | F21S 4/22 |
| 2017/0354019 A1 | 12/2017 | Julian et al. | |

OTHER PUBLICATIONS

Sun, C. et al., "Cost-Benefit Analysis of Sequential Warning Lights in Nighttime Work Zone Tapers", University of Missouri, Report to the Smart Work Zone Deployment Initiative, Jun. 6, 2011.

Internet Website Screen Capture, www.empco-lite.com; Sep. 6, 2010.

PCT International Search Report dated Apr. 27, 2018 in related PCT Application No. PCT/US2018/017683.

PCT International Search Report dated May 28, 2014 in PCT Application US2014/017756.

PCT International Search Report dated Mar. 18, 2016 in PCT Application No. PCT/US2015/060770.

PCT International Search Report dated Oct. 26, 2018 in PCT Application No. PCT/US2018/041126.

Extended European Search Report dated Jun. 20, 2018 in related European Application No. 15858697.4.

* cited by examiner

PORTABLE ELECTRONIC FLARE CARRYING CASE AND SYSTEM

RELATED APPLICATIONS

This patent application claims priority to U.S. Provisional Patent Application No. 62/457,638 filed Feb. 10, 2017, the entire disclosure of which is expressly incorporated herein by reference. This patent application is also a continuation-in-part of a) U.S. Design patent application Ser. No. 29/593,694 filed Feb. 10, 2017 and b) U.S. Design patent application Ser. No. 29/613,191 filed Aug. 8, 2017, the entire disclosure of each such application being expressly incorporated herein by reference.

FIELD OF THE INVENTION

The present invention relates generally to the fields of electronics and traffic engineering and more particularly to carrying apparatus and portable flare systems and methods for marking hazards or intended routes of travel on roadways and the like.

BACKGROUND OF THE INVENTION

Electronic flares are sometimes used in various applications to warn drivers/pedestrians of hazards, demarcate construction zones or detours, illuminate disabled or parked vehicles, and for other purposes. Currently available electronic flares include compact flares that may be placed along a roadway, on a disabled/parked vehicle, at a point of demarcation, etc. which incorporate flashing light emitting diodes (LEDs). Examples of electronic flares are described in U.S. Pat. Nos. 7,088,222; 7,106,179; 8,154,424; 8,550,653; 8,564,456; 8,579,460; 9,288,088; 9,835,319; D510,289; D515,957; D515,958; D560,533; D654,387; D669,805; D778,752 and D778,753 as well as U.S. Patent Application Publication Nos. 2013/0113634; 2016/0186971, the entire disclosure of each such patent and application being expressly incorporated herein by reference.

Pursuant to 37 CFR 1.71(e), this patent document contains material which is subject to copyright protection and the owner of this patent document reserves all copyright rights whatsoever.

SUMMARY OF THE INVENTIONS

The present invention provides electronic flare carrying cases and systems which comprise carrying cases in combination with electronic flares and associated apparatus for deploying, controlling and retrieving electronic flares. Unless specified otherwise, the term "electronic flares" as used herein shall be interpreted to include not only light-emitting flares are specifically described, but also signaling devices that emit signals other than light, such as sounds or electronic signals or other signals perceivable by humans or by devices designed to receive such signals.

In accordance with one aspect of the invention, there is provided a carrying case for electronic flares comprising a body having a front surface and a rear surface, a plurality of flare holding positions on the front surface and/or rear surface; and a handle. Each flare holding position may comprise at least one flare locator which guides placement of a flare at that flare holding position and at least one releasable attachment member which releasably holds a flare in place at that flare holding position. Such flare locators may comprise, for example, cavities, depressions, ridges, ribs, bumps, registry surfaces, guide members or other structures or devices configured to guide the vertical positioning, horizontal positioning and/or rotational orientation of the flare when placed at that flare holding position. In some embodiments the flare locators may comprise connectors for releasably attaching the flares to the case. In some embodiments, the flares may be caused to emit light while positioned in the flare holding positions on the case. The flare holding positions and/or locators and or connectors may be configured for use with electronic flares of various sizes and/or shapes, such as general shapes selected from: rectangular, rectangular with rounded corner, round, oval, ovoid, polygonal and star-like. In some embodiments, flares may be positionable on only one side of the case and in other embodiments flares may be positionable on both sides of the case.

Further in accordance with the invention, there are provided carrying cases of the above-summarized type or other carrying cases for electronic flares which include apparatus and circuitry (e.g., a power cord for connection of the case to a power outlet, a battery, etc.) useable for charging rechargeable flares when positioned in the flare holding locations.

Still further in accordance with the invention, there are provided carrying cases of the above-summarized type or other carrying cases for electronic flares which include switching apparatus for causing flares to automatically turn on or actuate upon removal from the case.

Still further in accordance with the invention, there are provided carrying cases of the above-summarized type or other carrying cases for electronic flares which include a remote controller for controlling flares. Such remote controller may comprise a radio transceiver which communicates with the flares, a microcontroller and a user interface. In some embodiments, the flares may be controllable by the remote controller included in or on the case or alternatively by another device such as a mobile phone, tablet computer, desktop computer, dedicated remote controller or other device programmed to effect remote control of the flares.

Still further in accordance with the invention, there are provided carrying cases of the above-summarized type or other carrying cases for electronic flares which include apparatus useable to guide or facilitate deployment of the flares. Such apparatus useable to guide or facilitate deployment of the flares may, for example, be selected from: extendable elongate members, elongate members with flare locations indicators at spaced-apart locations thereon, elongate members with apparatus for attaching or connecting flares thereto at spaced-apart locations thereon, light emitters that emit light to illuminate a line or pattern on a surface where flares are to be placed, laser light emitters that emit laser light to illuminate a line or pattern on a surface where flares are to be placed, etc. In embodiments where the apparatus comprises an elongate member or tether, the case may further comprise a reeling device or other winding or gathering apparatus for winding or gathering the elongate member or tether for stowing when not in use.

Still further in accordance with the invention, there is provided a system comprising a plurality of electronic flares and a carrying case configured for carrying the flares on or in the case, said system further comprising at least one element selected from: apparatus useable for causing the flares to automatically turn on or become active upon removal from the case; apparatus useable for delivering electrical charge to the flares while the flares are positioned on or in the case; apparatus useable for facilitating deployment and/or retrieval of the flares and apparatus useable for remotely controlling the flares. The case may be any suitable type of case, such as a case which forms an enclosure within which the flares are carried or a case which has one or more outer or exposed walls or surfaces on which the flares are carried.

Still further in accordance with the invention, there are provided methods for using the carrying cases and systems disclosed herein.

Still further aspects and details of the present invention will be understood upon reading of the detailed description and examples set forth here below.

BRIEF DESCRIPTION OF THE DRAWINGS

The following detailed description and examples are provided for the purpose of non-exhaustively describing some, but not necessarily all, examples or embodiments of the invention, and shall not limit the scope of the invention in any way.

DETAILED DESCRIPTION

The following detailed description and the accompanying drawings to which it refers are intended to describe some, but not necessarily all, examples or embodiments of the invention. The described embodiments are to be considered in all respects only as illustrative and not restrictive. The contents of this detailed description and the accompanying drawings do not limit the scope of the invention in any way.

Figure 1:
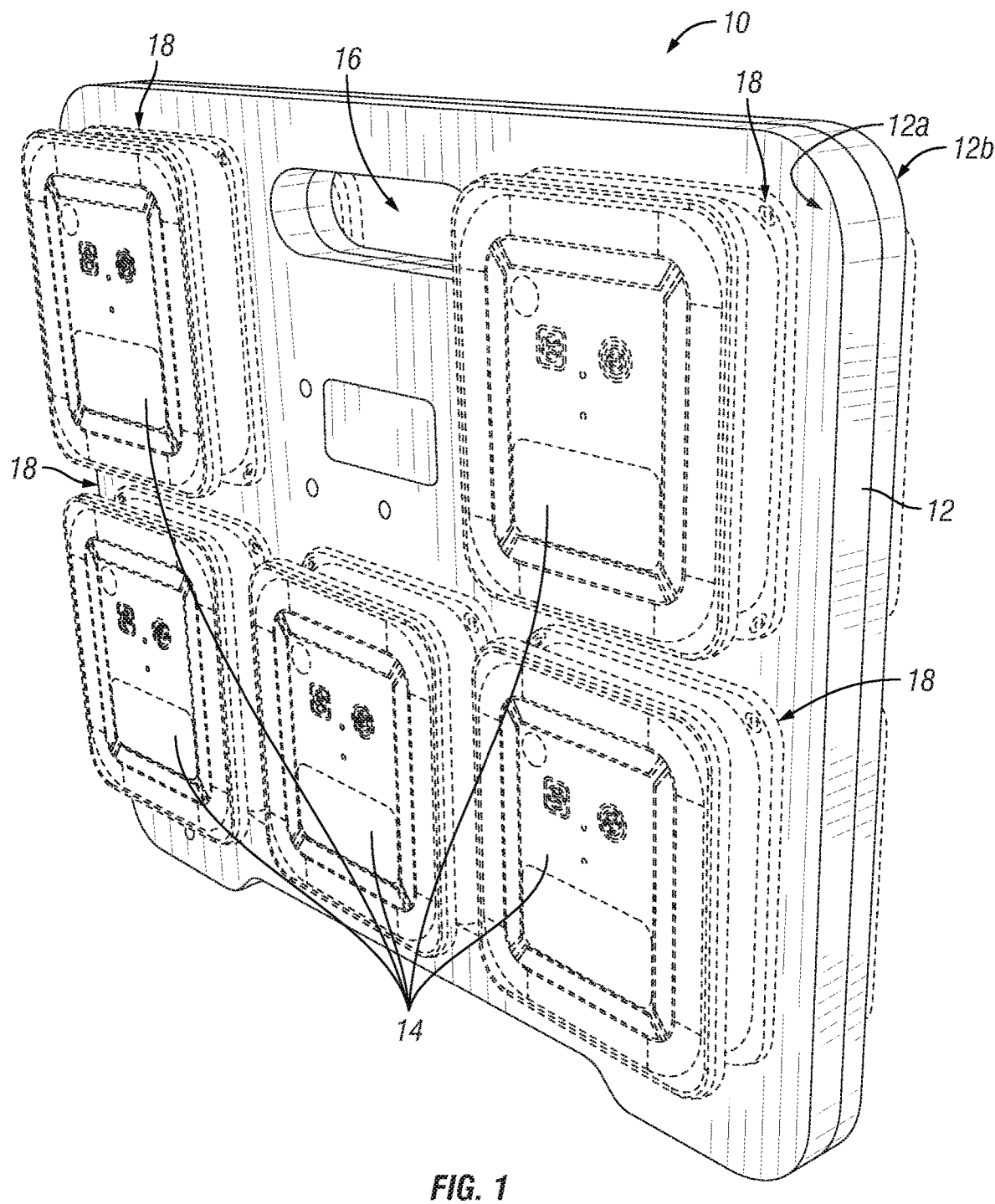
FIG. 1 is a perspective view of one embodiment of a portable flare system of the present invention comprising a carrying case of the present invention with flares mounted on front and/or rear surfaces of the carrying case.
Figure 2:
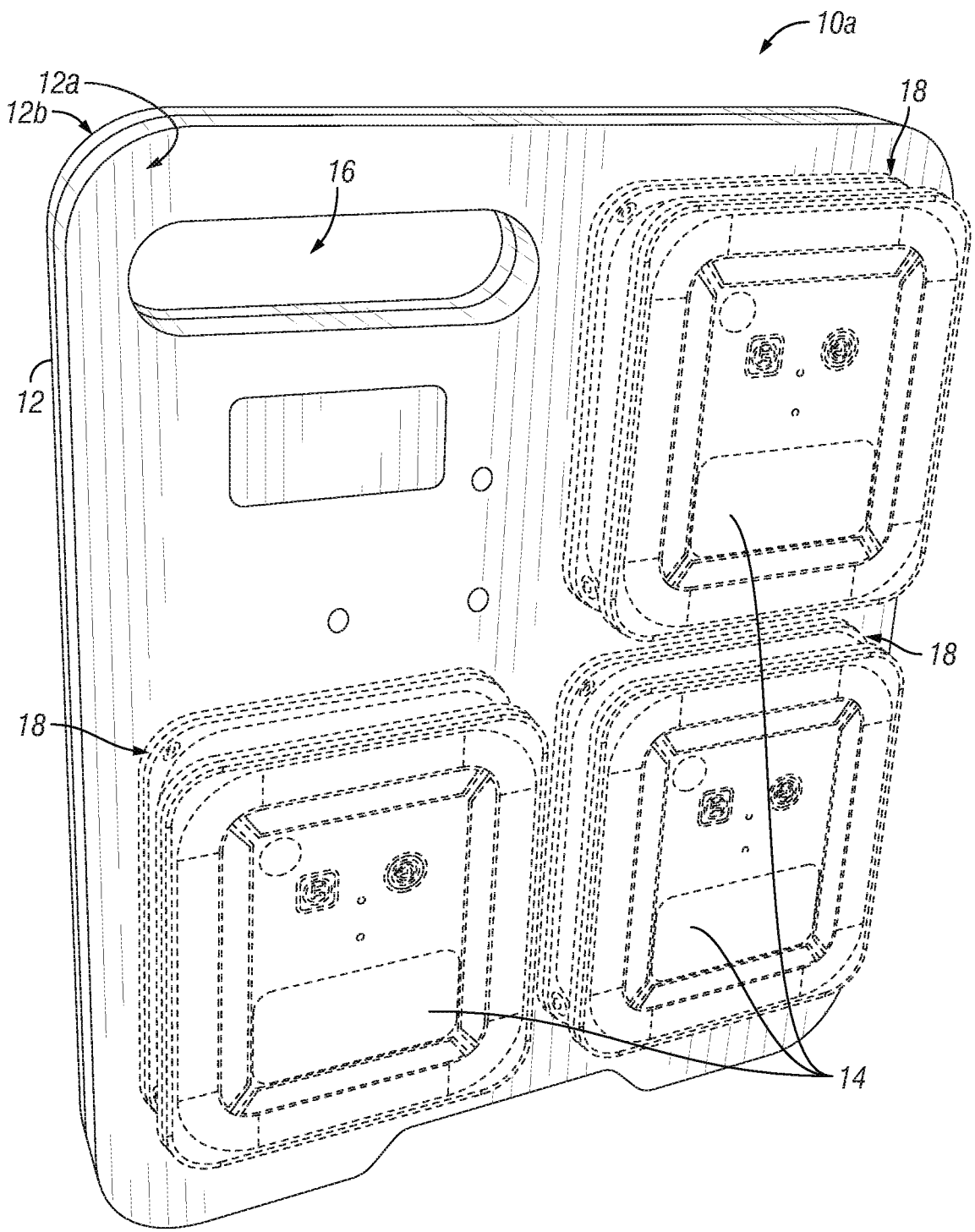
FIG. 2 is a perspective view of another embodiment of a portable flare system of the present invention comprising a carrying case of the present invention with flares mounted on front and/or rear surfaces of the carrying case.
Figure 3A:
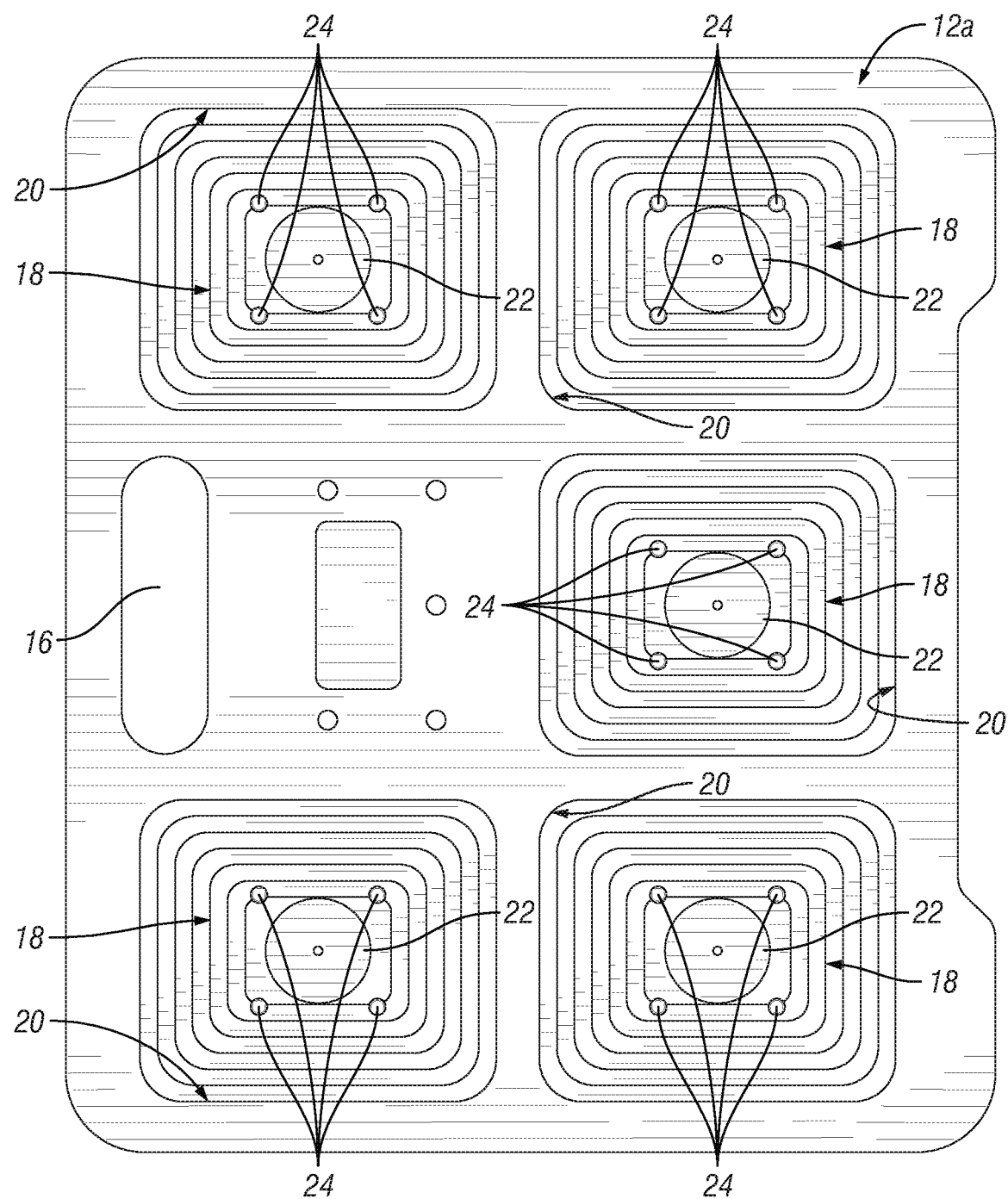
FIG. 3A is a front view of the carrying case of the embodiment shown in FIG. 1.
Figure 3B:
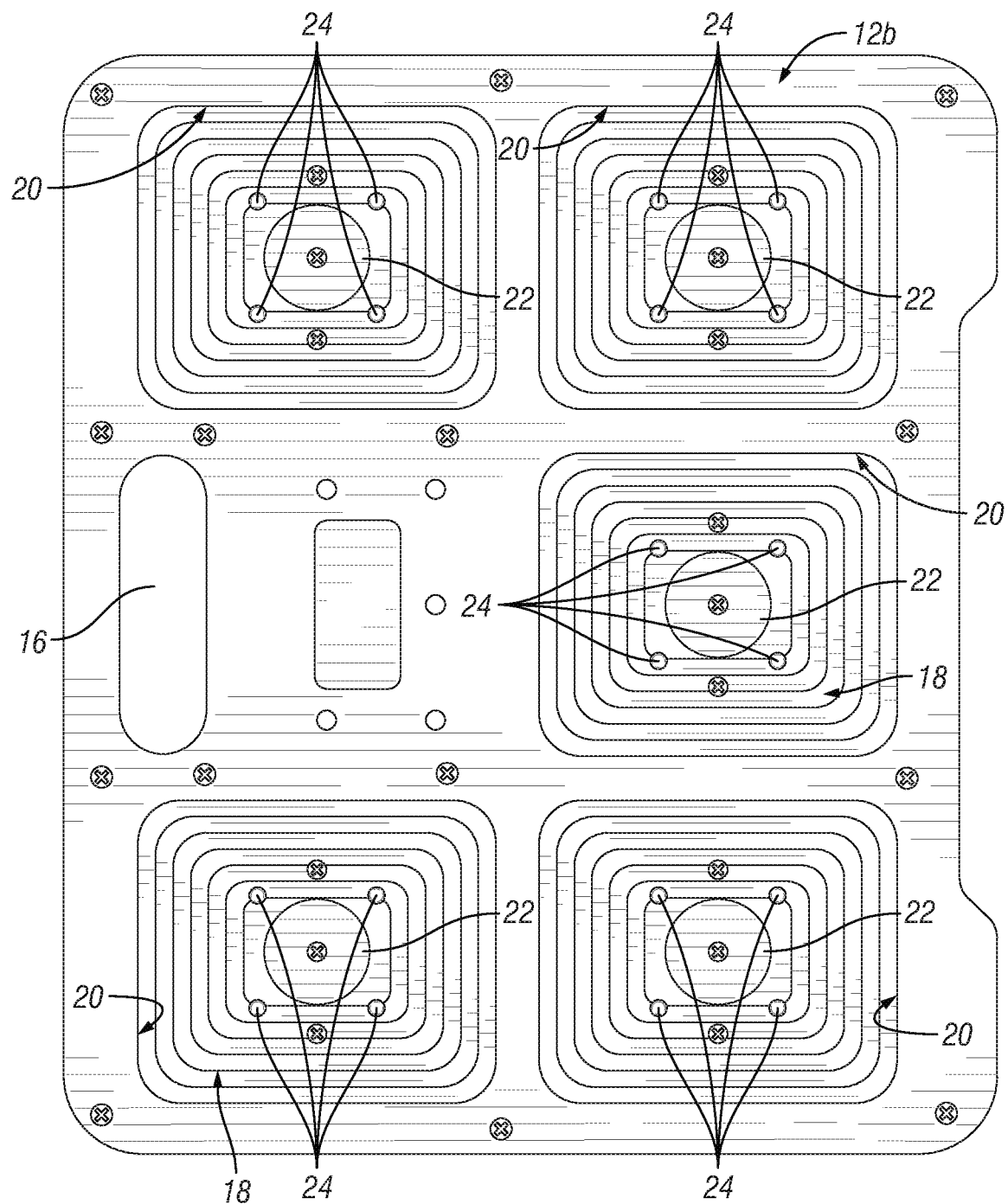
FIG. 3B is a rear view of the carrying case of the embodiment shown in FIG. 1.
Figure 4A:
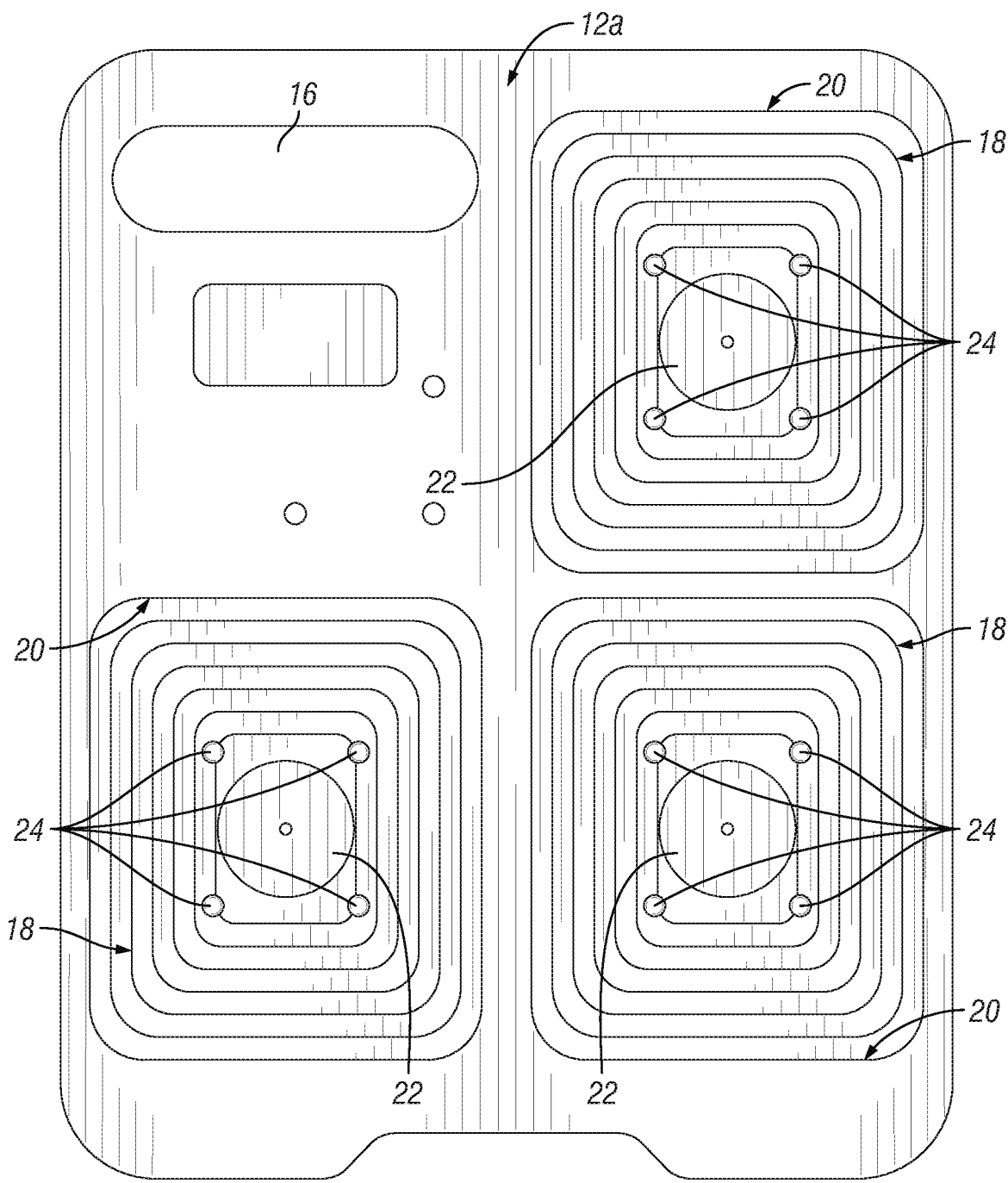
FIG. 4A is a front view of the carrying case of the embodiment shown in FIG. 2.
Figure 4B:
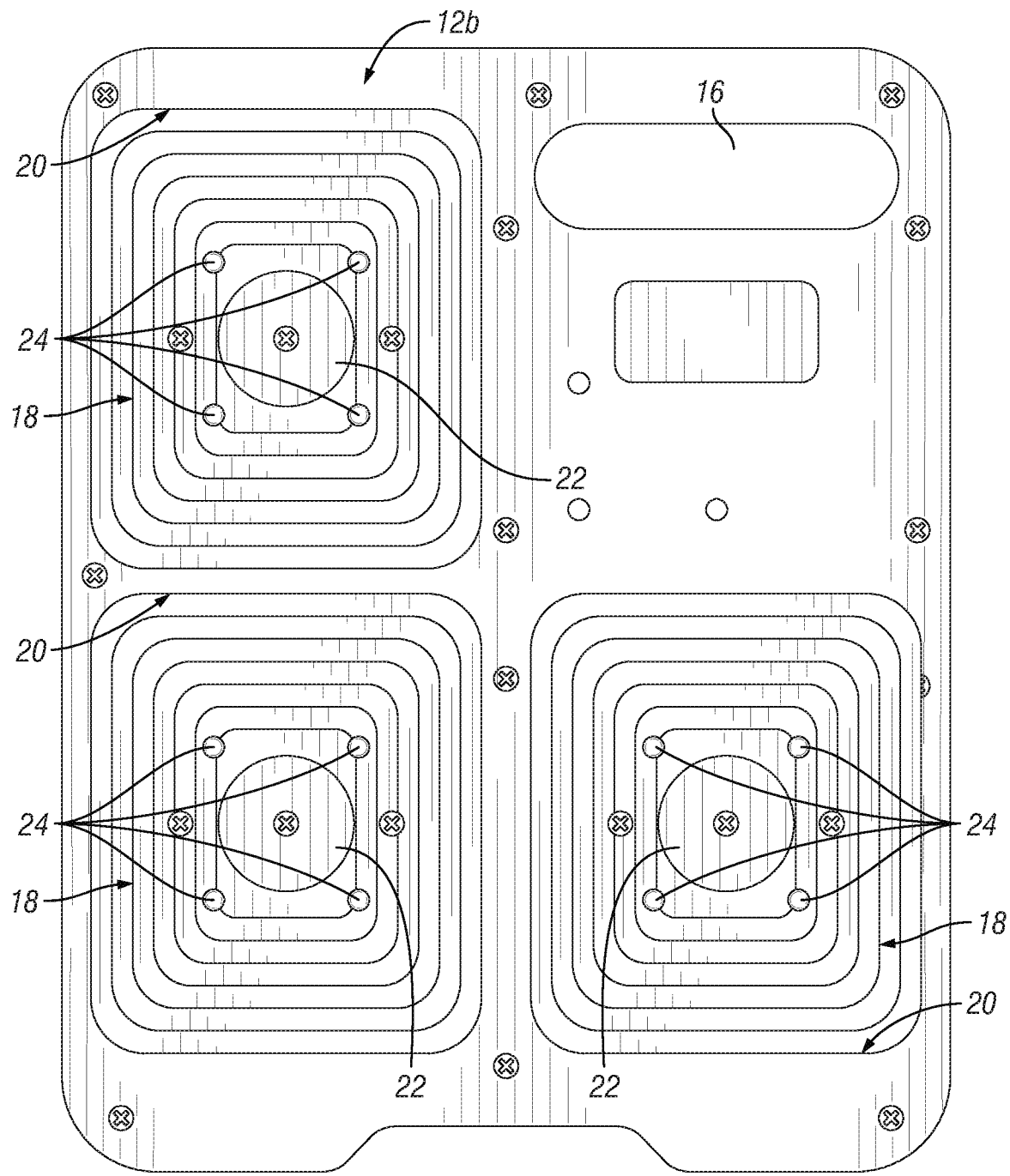
FIG. 4B is a rear view of the carrying case of the embodiment shown in FIG. 2.

The carrying cases of the present invention may be configured to carry any suitable number of flares. For example, FIG. 1 shows a portable flare system 10 of the present invention wherein the carrying case 12 is useable for carrying up to ten (10) flares 14 while FIG. 2 shows a portable flare system 10a of the present invention wherein the carrying case 12 is useable for carrying up to six (6) flares. Other sizes and configuration may alternatively be used in accordance with this invention.

As shown in the drawings, each carrying case 12 may comprise a body (e.g., a flat planar body or any other suitable body configuration) having front and rear surfaces 21a, 12b. A plurality of flare holding positions 18 are formed on the front surface 12a and/or rear surface 12b. Flares 14 are mountable in the flare holding positions 18. The case 12 may have a handle 16.

In some embodiments, each flare holding position 18 may comprise flare locator(s) which guide placement of a flare 14 at that flare holding position 18. In the examples shown, such flare locator(s) comprise shallow locator wells (e.g., cavities or depressions) defined by perimeter walls 20 which correspond to the perimeter configurations of the flares 14 such that the flares 14 will insert and become seated, in specific positions and rotational orientations, within each locator well. As an alternative to the locator wells shown in these examples, various other types of flare locator(s) may be used, such as; other cavities, other depressions, ridges, ribs, bumps, registry surfaces, guide members or other structures or devices that are configured to guide or dictate the vertical positioning, horizontal positioning and/or rotational orientation of the flares 14 when placed at that flare holding positions 18.

The case 12 further comprises releasable attachment members 22 for releasably holding the flares 14 in place at the flare holding positions 18. In the example shown, the releasable attachment members 22 comprise magnets which interact with ferromagnetic regions or other magnets located on the flares 14 to hold the flares 14 in place when positioned in the flare holding positions 18. Any suitable types of releasable connectors may be used as alternatives to magnets. For example, the releasable attachment members 22 may comprise other magnets, hooks, pins, fasteners, adhesives, hook & loop material (e.g., Velcro), bayonet fixtures, friction fit rims or other apparatus for releasable holding of the flares 14 in place at that flare holding positions 18.

In some applications, the cases 12 may be used to carry flares 14 that are non-rechargeable, such as those powered by changeable alkaline batteries. However, in other applications the cases 12 may be used to carry flares 14 that have rechargeable power sources (e.g., rechargeable batteries). To facilitate recharging of rechargeable flares 14 when positioned in the flare holding positions 18, some embodiments of the cases may optionally incorporate electrical contacts 24 and other circuitry/apparatus for charging rechargeable flares 14 when mounted in the flare holding positions 18. In some such embodiments, the optional recharging circuitry/apparatus may include a power cord for connecting the case to a power outlet (e.g., a 9 v or 12 v power outlet, 110-240 AC mains, etc.) as may be located in a building, garage, emergency vehicle, etc.

Figure 5:
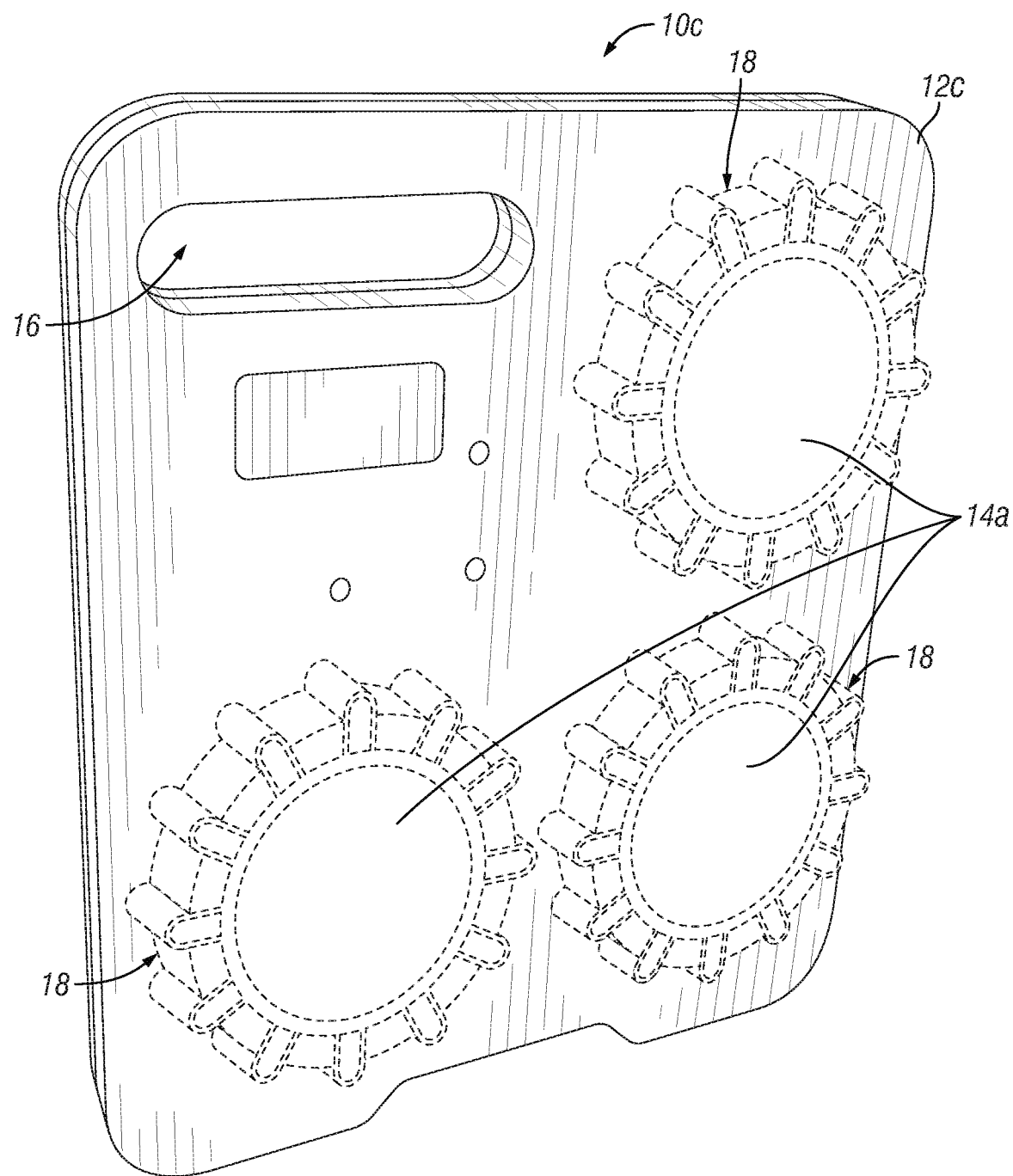
FIG. 5 is a perspective view of an alternative version of the embodiment shown in FIG. 1 adapted for caring flares having generally round shapes (e.g., round, ovoid, star-like, asterisk-like, etc.) than flares having generally rectangular shapes (e.g., rectangular, rectangular with rounded corners, square, etc.).
Figure 6:
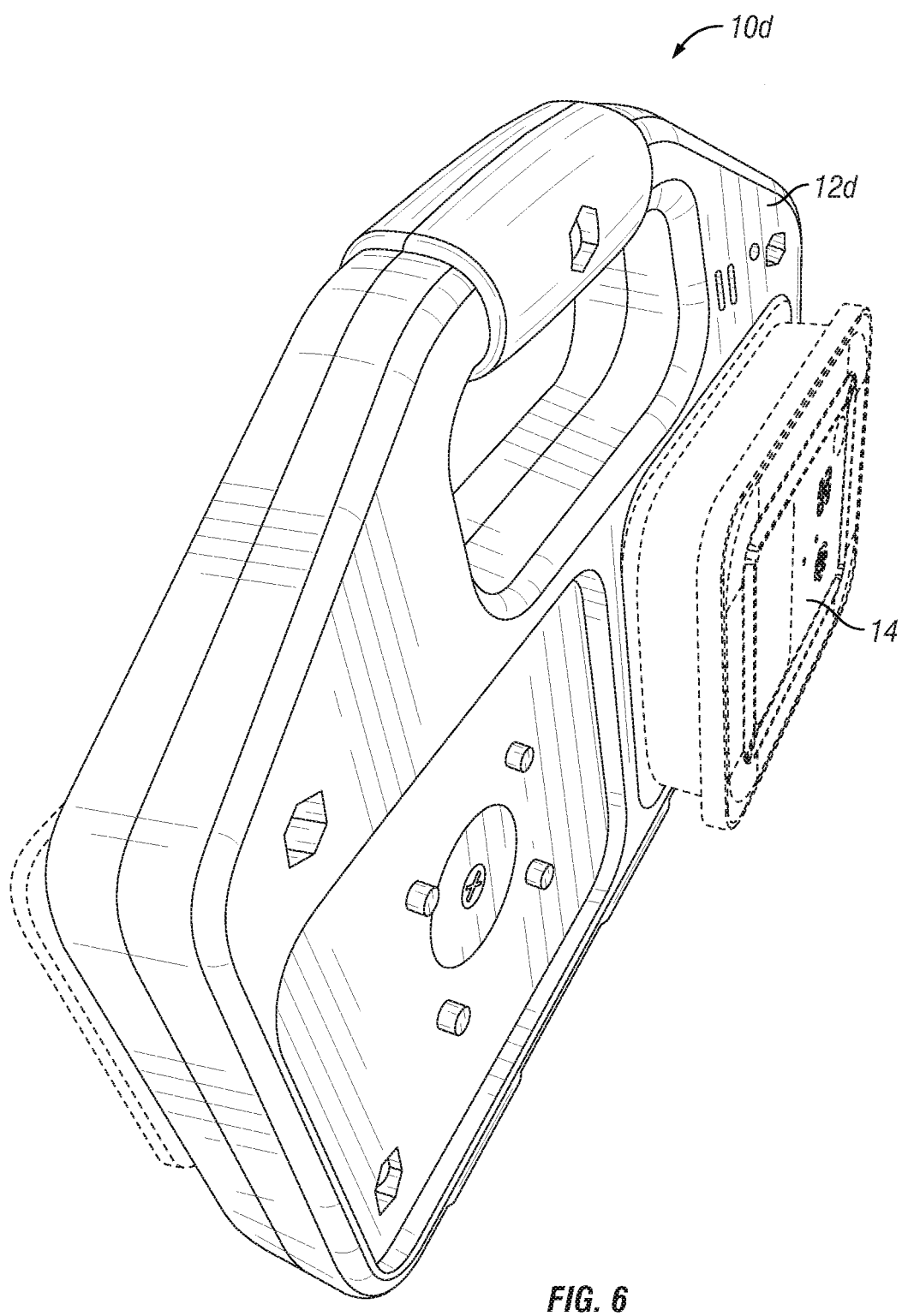
FIG. 6 is a perspective view of another embodiment of a portable flare system of the present invention.
Figure 7:
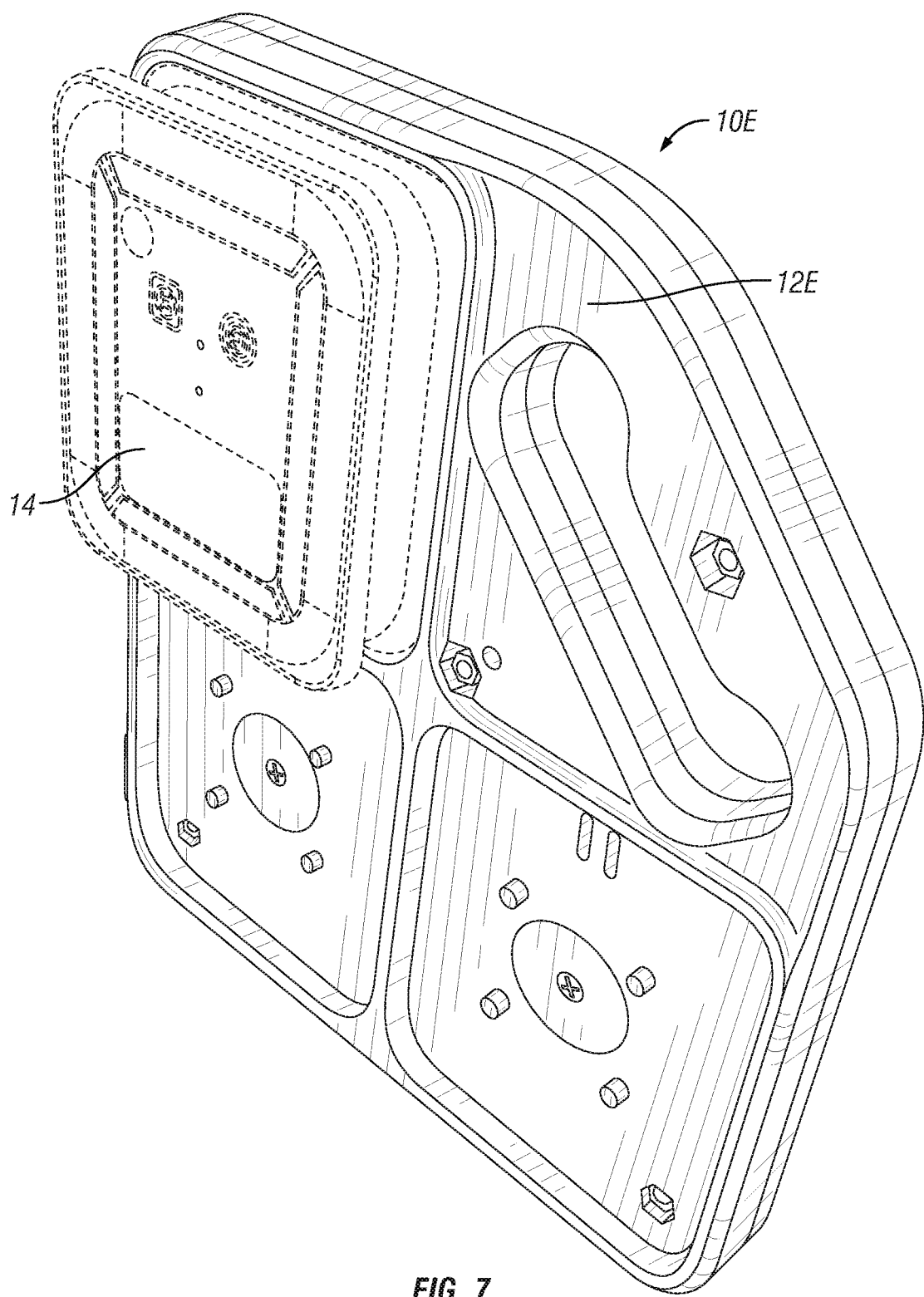
FIG. 7 is a perspective view of another embodiment of a portable flare system of the present invention.

The examples shown in FIGS. 1 through 4B show flare holding positions 18 and flares 14 that are generally rectangular (i.e., rectangular with rounded corners) in shape. However, the flare holding positions 18 may be constructed to accommodate flares of any suitable shape, including for example other generally rectangular shapes, square round, oval, ovoid, polygonal, star-like, asterisk-like, multi-lobar, etc. By way of example, FIG. 5 shows an alternative version of the embodiment seen in FIG. 1, wherein the flare holding positions 18 are configured to hold generally round flares (e.g., flares with round bodies and small radial projections resulting in a star-like or asterisk-like perimeter configuration.) This is but one of many possible shapes of the flares 14. Non-limiting examples of flares that may be useable in combination with carrying cases 12 of the present invention include, but are not necessarily limited to, those described in the above-incorporated U.S. Pat. Nos. 7,088,222; 7,106,179; 8,154,424; 8,550,653; 8,564,456; 8,579,460; 9,288,088; 9,835,319, D510,289; D515,957; D515,958; D560,533; D654,387; D669,805; D778,752 and D778,753 as well as U.S. Patent Application Publication Nos. 2013/0113634; 2016/0186971. Also, other non-limiting examples of flares that may be useable in combination with carrying cases 12 of the present invention include but are not necessarily limited to the LED flares commercially available from: Pi Variables, Inc., Tustin, Calif.; Wagan Corporation, Hayward, Calif.; Aervoe, Gardnerville, Nev. and Powerflare Corporation, Menlo Park, Calif.

In addition to function as a carry case 12 and/or recharging station, the carrying cases 12 and systems 10, 10a of the present invention may also be used for protection of individuals (e.g., emergency responders, roadway maintenance workers, stranded drivers, persons deploying or collecting the flares 14 etc.). Because the flares 14 are mounted on outer surfaces of the case 12, the flares 14 may in some instances be allowed to continue to emit light when mounted in the flare holding positions 18. This differs from storage cases currently available for electronic or LED flares wherein flares are placed inside of the case and the case must be opened to allow insertion or removal of the flares. An advantage of this style case 12, in which the flares are positioned on outer or exposed walls or surfaces of the case, is that the operator need not open a carrying case or place it on the ground or the trunk of a vehicle to deploy or retrieve the flares. Rather, flares may be mounted on the outer surfaces of the case 12 of the present invention while the operator continues to hold the case 12 and such flares may, if desired, continue to emit light. In this manner, light will emanate from the case 12 while it is being carried by an individual, thereby making the individual's location more visible to oncoming traffic.

In some instances, the flares 14 may be designed such that all of the flares 14 will turn off in response to pushing of a single off button on one of the flares or elsewhere (e.g., the pi-Lit® Sequencing Road Surface Flare available from Pi Variable, Inc., Tustin, Calif.). When such flares 14 are used, an individual who is collecting the blinking flares 14 from deployed positions along a roadway may allow one or more of the flares 14 to continue to blink after they/it have/has been collected and placed in flare holding position(s) 18 on the case 12, thereby causing flare(s) 14 on the case 12 to providing a clear indication of that individual's position along the roadway as the individual completes the flare collection process. After all of the flares have been collected and the individual has moved to a location out of harm's way, the blinking flare(s) 14 may then be turned off (individually or in unison if possible) so that that they no longer emit light while stowed in a vehicle or other location.

Optional Automatic Actuation and/or De-actuation of Flares

Figure 8:
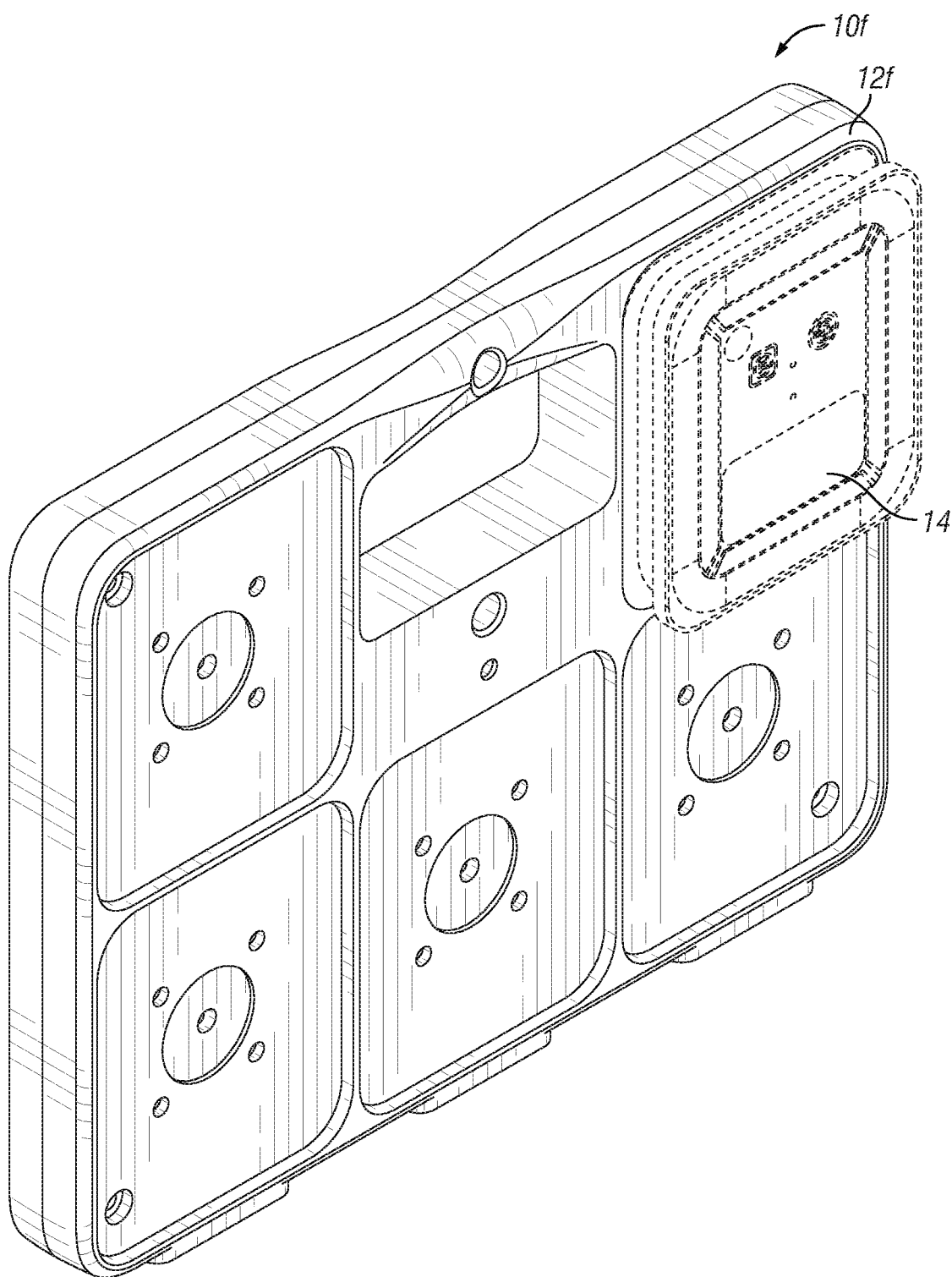
FIG. 8 is a perspective view of another embodiment of a portable flare system of the present invention.

The flares can be programmed to turn on when they are removed from the magnetic attachment to the carrying case. As seen in the system 10f (w/Tether) shown in the example of FIG. 9, a carrying case 12f (w/tether) is substantially the same as that shown in FIG. 8, but item 102 represents flare being removed from the carrying case and turning on.

This can be accomplished by removing the power supplied by the case to the flare. An on-board rechargeable battery located in the carrying case will supply voltage to the Enable pin of the voltage regulator. When this voltage is removed by removing the flare from the case the Enable pin will turn on the power to the flare using its own battery source. When the flare is removed, the loss of power would trigger the flare to turn on. An alternative approach is for the presence of a magnet and absence of a magnet to trigger the flare to turn on. Another activation approach may be implemented using a magnetic proximity sensor. As the flare is removed from the carrying case, a, sensor in the flare separated from a small magnet (rare earth, for example) embedded in the carrying case would, by virtue of the flare's separation from the case, activate a Hall Effect sensor, reed switch, or other magnetic device and thus turn on the flare, The benefit of having the flare turn on upon removal from the case is that the operator (police, fire, utility company, civilian, etc.) does not have to search for a button in the dark or while on a busy roadway or other dangerous area. In addition, by turning on the flare upon removal from the case deployment can be quicker.

Optional Apparatus for Remote Control of Flares

Using radio communication, flares 14 equipped with radio receivers that are attached to the carry case may be controlled remotely using any suitable type of remote control apparats including but not limited to a mobile phone, tablet computer or other computing device that is programmed to control the flares and or a dedicated remote control as a hand held remote controller, a remote controller that is mounted on or in the case, a remote controller that is positioned in an emergency vehicle, etc. The use of a software application on a mobile phone, tablet, etc. provides a method for updates including modifications and/or new features to be pushed to the operator over a cellular network. In some embodiments, firmware improvements can be applied to the LED flares 14 using the mobile phone and carrying case combination.

In some instances, the necessary remote control apparatus and electronic circuity can be incorporated directly into the carrying case 12 such that the case itself becomes the remote control unit. For example, a microcontroller and radio transceiver, incorporated into the plastic enclosure of the carrying case would be controlled by tactile momentary contact switches or capacitance sensitive switches located on the surface of the carrying case, voice commands, mechanical percussive or rotational gestures, etc. Signals generated and transmitted by the carrying case could control lamp flash pattern, brightness, on-off state, direction of pattern march, simultaneous flashing, as well as orientation of flash and choice of LEDs flashing. This would provide the operator with an always available remote control system able to operate various operational parameters of the flare from a distance of 300 meters or greater. Rather than placing a cellular module in each lamp, a single cellular communication device can be placed in the carrying case and this would then communicate with an unlimited number of flares 14 via a mesh network from a location limited only by internet availability. For example, an operator can control the flares 14 from a remote location via the cellular node located in the carrying case. Features that can be remotely controlled include, but are not limited to:

Choice of a particular flash pattern (e.g., fast flashing progression, slow flashing progression, flares flashing in groups (e.g., 2 at a time), long light emission per flash, short light emission per flash, etc.);

Choice of which LEDs to flash (e.g., top or side LEDs);

Reversing or alternating sequence and flash direction;

Turning flares 14 on and off with or without preservation of the previously set flashing pattern;

Locking buttons or other control inputs on the flares 14 to avoid unwanted or unintended input or changing of setting by unauthorized personnel; and/or Performing battery status check of each lamp.

Figure 10:
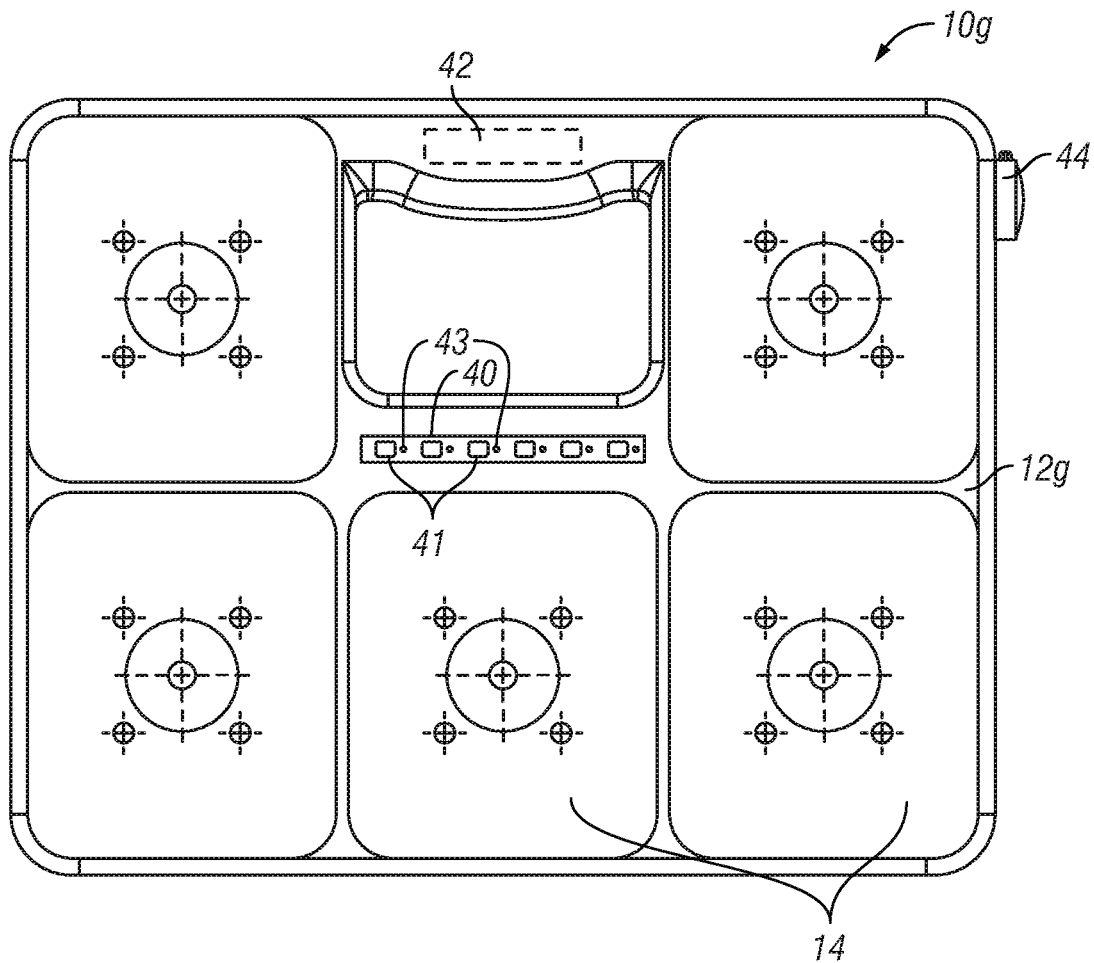
FIG. 10 shows one embodiment of a portable flare system of the present invention which incorporates; a) an optional power source, b) an optional remote control and c) an optional laser for projection of a straight line(s) on an adjacent surface to guide subsequent placement of flares.

In some embodiments, apparatus for remote control of the flares 14 may be integrated into the carrying case 12 or may be linked to a dedicated controller such as a hand-held remote controller or a remote control console mounted in an emergency vehicle or elsewhere. FIG. 10 shows one non-limiting example of a carrying case/flare system 10g in which the carrying case 12g includes an optional remote control device 40 as well as other optional features discussed in other sections of the patent application. the carrying case Using the charge carrying case to carry a "translator" between Bluetooth, Zigbee, Wi-Fi, cellular, or other communications protocol: Electronic radio emitting flares can operate via a number of different radio communication protocols. The ubiquitous nature of mobile smart phones provides opportunity for a smart phone application to control various operational parameters of the distant flare. However, as smart phone technology currently is limited to using Bluetooth, cellular or Wi-fi to connect to local devices and the flare may be using Zigbee or other protocol, a "translator" circuit board could be embedded in the carrying case to provide for connection of the mobile phone to the flashing lamp. This would then allow for a simple, user friendly, graphical user interface on the smart phone to be used as a control screen for the flashing flare. This addition would also allow for control of the flashing flares 14 from a distance via Internet and cellular communication. As the carrying case will always be present when the flares are in use, the necessary translator will always be within range.

In the example of FIG. 10, the case 12g includes a case-integrated remote control 40 comprising a radio transceiver and microcontroller having a user interface. In the example shown in FIG. 10, the user interface includes buttons 41 labeled "inhibit," "pattern," Top/Side," "Reverse," "Group" and "Off" with an indicator light 43, such as a small LED, next to each button. The case-integrated remote control 40 shown in the example of FIG. 10 is useable as follows:

INHIBIT—This function allows the operator to pause the flares 14 from flashing while maintaining their current sequence and other settings. When the button 41 labeled "Inhibit" is pushed the indicator 43 next to that button will illuminate and all flares 14 being controlled with cease emitting flashes of light, but the flares 14 will continue to communicate with neighboring flares via radio and maintain their sequence order. Thereafter, again depressing the button 41 labeled "inhibit" will cause the associated indicator 41 to turn off and the flares 14 will once again begin flashing in the previously determined sequence in accordance with the previously set pattern and other programmed settings.

PATTERN—The button 41 labeled "Pattern" may be used to select a particular flare flashing pattern from a number of pre-programmed flashing pattern options stored in the microcontroller. A user may select the desired flashing pattern by depressing the "Pattern" button a number of times to correspond to the flashing pattern being selected. For example, pressing the "Pattern" button 41 a single time will cause the flares 14 to flash according to a pre-programmed Pattern #1 and the indicator 43 next to the "Pattern" button 41 will blink in single flashes to indicate that Pattern #1 is currently selected. Pressing the "Pattern" button 41 twice in succession will cause the flares 14 to flash according to a pre-programmed Pattern #2 and the indicator 43 next to the "Pattern" button will periodically emit two flashes of light to indicate that Pattern #2 is currently selected. Pressing the "Pattern" button 41 three times in succession will cause the flares 14 to flash according to a pre-programmed Pattern #3 and the indicator 43 next to the "Pattern" button will periodically emit groups of three flashes of light to indicate that Pattern #3 is currently selected, and so on. Alternatively, a single press of the button will step through the choices one at a time, returning to the first (default) choice when the last choice is passed by. In this example, the remote controller 40 may store as many as 5 or more selectable flashing patterns, such as a fast flashing progression (Pattern #1), slow flashing progression (Pattern #2), long light emission per flash (Pattern #3), short light emission per flash (Pattern #4), and flares 14 flashing in pairs (Pattern #5). In some embodiments one of the available patterns may be a steady-on pattern where all of the flares illuminate continuously with no blinking or flashing. Also other optional flashing patters (e.g., long-short-long or long-long-short, etc.) may be provided.

TOP/SIDE—In some embodiments the flares 14 may be capable of emitting light, either from the side(s) of the flares 14 and the flares 14 may be equipped with sensors to or from the tops of the flares 14 and may incorporate gravity-actuated switches or attitude sensors that can automatically cause the flare 14 to switch between a side-emitting mode and a top-emitting mode depending on whether the flare is in a horizontal or vertical position. Examples of such flares 14 are described in above-incorporated U.S. Pat. No. 9,835, 319. When such flares are used in conjunction with the case 12f of FIG. 10, the user may use the button 41 labeled "top/side" to control whether the flares 14 are operating in top-emitting mode or side-emitting mode. For example, pressing the "Top/Side" button 41 a single time will cause the flares 14 to operate in automatic mode based on input to each flare from its gravity-actuated switch or attitude sensor and the indicator light 41 next to the "Top/Side" button 41 will blink in single flashes to indicate that the flares are operating in automatic or "default" mode. Pressing the "Top/Side" button 41 twice in succession will cause the flares 14 to cause all of the controlled flares 14 to operate in side-emitting mode and the indicator 43 next to the "Top/Side" button will periodically emit two flashes of light to indicate that side-emitting mode is currently selected. Pressing the "Top/Side button 41 three times in succession will cause all of the controlled flares 14 to flash in top-emitting mode and the indicator 43 next to the "Top/Side" button will periodically emit groups of three flashes of light to indicate that the flares are operating in top-emitting mode.

REVERSE—The button 41 labeled "Reverse" may be used to reverse the sequential order in which the controlled flares 14 flash. For example, if a row or series of ten (10) flares 14 is being controlled, the flares 14 may automatically default to flash in serial order beginning with Flare 1 and ending with Flare 10. When operating in such default condition the indicator 41 next to the "Reverse" button 43 will not be illuminated. However, depressing the "Reverse" button will cause the flares to blink in reverse order beginning with Flare 10 and ending with Flare 1 and the indicator light 41 next to the "Reverse" button 43 will illuminate to indicate that the flares 14 are flashing in reverse order.

GROUP—In some applications flares may be deployed in different groups and the remote controller 40 may be used to control more than one group of flares 14. The button 41 labeled "Group" may be used to select a particular group of flares 14 to be controlled. Each group may be set to perform differently and independently from other group(s). There is no limit to the number of flares 14 in any one group, even if there are multiple groups operating in close proximity. For example, the microcontroller of remote controller 40 may be a plurality of different Group ID choices and the button 41 labeled "Group" may be depressed a particular number of times to select a particular group of flares 14 for control. For example, pressing the "Group" button 41 a single time will cause the remote controller 40 to communicate with the flares 14 of Group ID #1 and the indicator 43 next to the "Group" button 41 will blink in single flashes to indicate that Group ID #1 is currently being controlled. Pressing the "Group" button 41 twice in succession will cause the remote controller 40 to communicate with the flares 14 of Group ID #2 and the indicator 43 next to the "Pattern" button will periodically emit two flashes of light to indicate that Group #2 is currently being controlled, and so on.

OFF—Depressing the button 43 marked "Off" will turn off all of the flares 14 being controlled at that time. This allows all of the flares 14 to be turned off from a safe location rather than requiring a user to turn each flare 14 off individually. In contrast to use of the "Inhibit" button 43 described above, depressing the "Off" button 43 will cause all of the controlled flares 14 to cease communicating with neighboring flares and the previously-discerned sequence of the flares 14 will be lost.

Optional Apparatus for Assisting in Deployment and/or Retrieval of Flares

The present invention also provides flare carrying cases which include one or more apparatus for assisting in deployment and/or retrieval of the flares 14.

Figure 9:
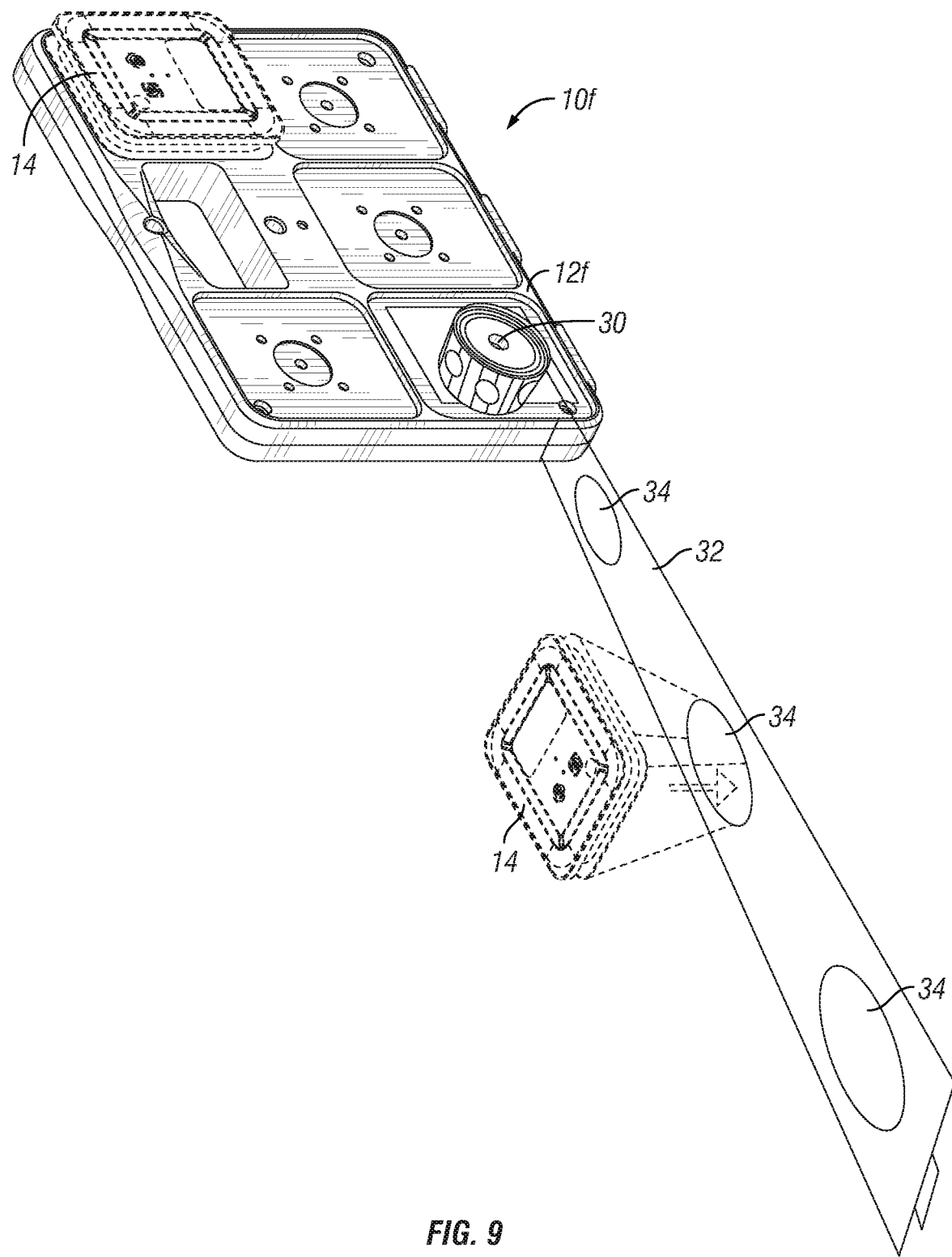
FIG. 9 shows one embodiment of a portable flare system of the present invention which incorporates an optional flare tether.

For example, FIG. 9 shows a flare system 10f (w/tether) in which the case 12f (w/tether) incorporates a reeling device 30 and extendable/retractable tether 32 useable to facilitate deployment of the flares 14 in a straight row. The tether 32 may be made of any suitable material (e.g., a cloth or woven polymer ribbon, string, cable, etc.) and may be of any suitable width and length (e.g., approximately 150 feet in length). The reeling device 30 may be mounted in or on any type of flare carrying case or may be attached as a separate unit. The reeling device 30 may be turnable by a hand crank, electric motor or other suitable mechanism or, alternatively, be spring-loaded such that the tether 32 can be pulled out and locked in an extended position for use and, thereafter, retracted back onto the reeling device 30 after use by releasing the lock and allowing the spring load of the reeling device 30 to reel in the tether 32.

As seen in FIG. 9, flare location indicators 34 may be provided at spaced-apart locations on the tether 32 to facilitate placement of flares 14 at desired intervals along the line demarcated by the extended tether 32. Such flare location indicators 34 may, in some embodiments, comprise marks which indicate locations at which flares may be placed to provide a certain desired spacing between the flares. In other embodiments, such as the example shown in FIG. 9, the flare location indicators may comprise connectors (e.g., mechanical, magnetic, frictional, etc.) that actually connect or attach the flares 14 to the tether 32. In the non-limiting example of FIG. 9, the flare location indicators 34 comprise ferromagnetic members (e.g., ferrite washers) positioned at desired intervals (e.g., every 10 feet for example) and the flares 14 have magnets which will attach the flares to the ferromagnetic members. The magnets on the flares 14 may also be used to magnetically attach the flares to the carrying case 12f (w/tether) or any other carrying case 12 in the manner described above. In some embodiments the distance between flare location indicators 34 may be variable. For example, the tether 32 may have color coded connectors for connecting ferrite washers to the tether at different spacing intervals. This will allow for the operator to choose the desired spacing interval (e.g., 3-meter spacing, 5-meter spacing, etc) for the particular application.

In the embodiment shown in FIG. 9, an operator may extract and lock the tether 32 in an extended position lying upon a road surface and then attach the flare 14 to the flare location indicators 34 thereby causing the flares to be positioned at desired intervals in a substantially straight line. The flares 14 may then be used and controlled as described herein. Following use, the flares 14 and tether 32 may be retrieved by hand-over-hand pulling of the tether 32 with the attached flares 14 to a safe location. This allows the operator to retrieve the flares 14 without having to once again walk towards traffic to pick them up. The flares may then be detached from the tether 32 and stowed on the case 12f (w/tether) and the tether 32 may then be reeled back to its stowed position on the reeling device 30.

In some applications, the tether may be unreeled or pulled off of the reeling device 30 and the flares 14 may initially be connected or attached to the tether 32 while at a safe location, such as a position shielded by a parked emergency or work vehicle. Thereafter, with the tether 32 and the attached case 12f (w/tether) may be firmly held in a fixed position (e.g., by attaching the case 12f (w/tether) to the rear of the parked vehicle or other stationary object) or, if the proximal end of the tether 32 is not attached to a case, the proximal end of the tether 32 may be attached directly to a vehicle or stationary object by any suitable connector such as a hook, Velcro, etc. An operator may then grasp the free (e.g., distal) end of the tether 32 and walk along the roadway (e.g., upstream towards traffic) while pulling the tether 32 and the attached flares 14 along. As the operator walks towards oncoming traffic the flares 14 will be drawn to rest in a straight line dictated by the tether 32. By design or by instruction, the flares may be attached to only one side of the tether 32 as seen in the example of FIG. 9. The sides of the tether 32 may in some embodiments be of different colors so as to be easily identified by the operator. Once the tether 32 is pulled taut by the operator, all of the flares 14 will be on the same side of the tether 32 and, hence, all flares 14 will be oriented properly for light emitted from the flares 14 to be observed by oncoming traffic in the intended manner.

Figure 10A:
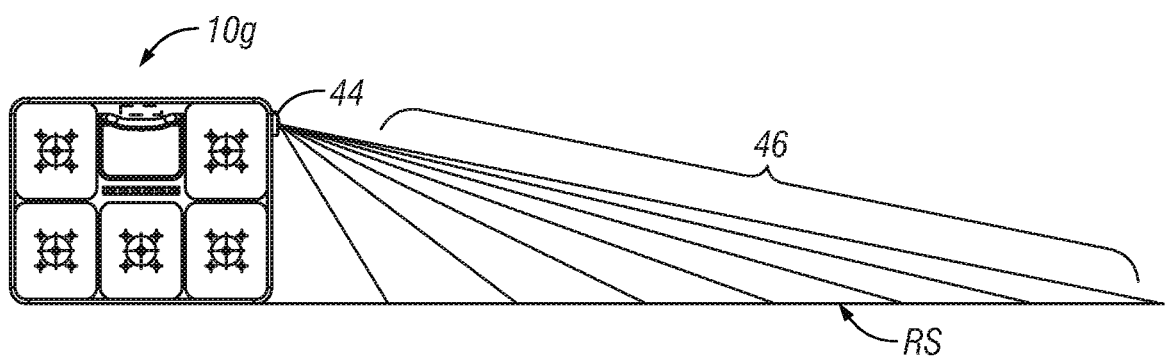
FIG. 10A is a schematic diagram showing the system of FIG. 10 in operation with the optional laser being used to project light onto a road surface to guide subsequent placement of flares.
Figure 11:
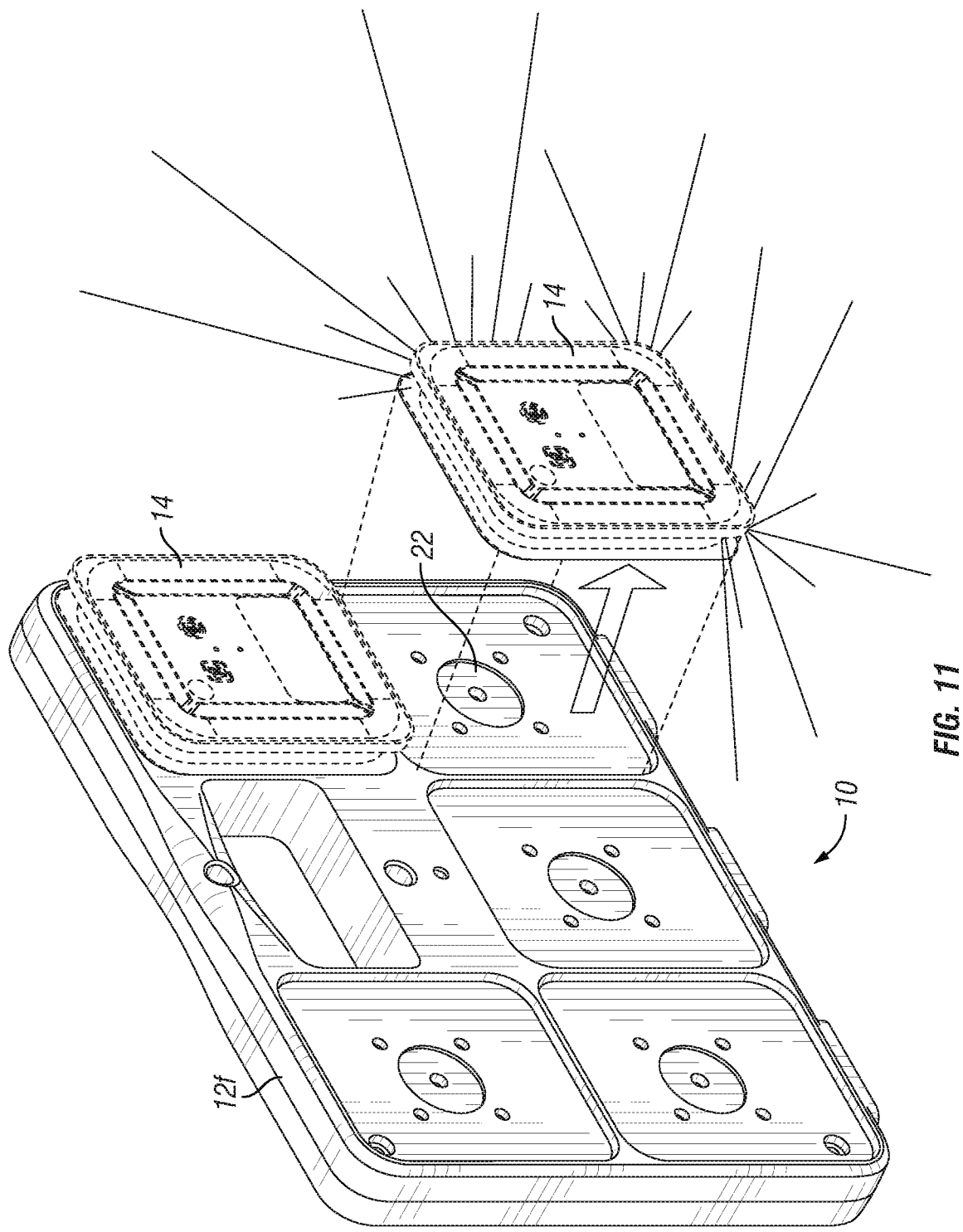
FIG. 11 shows one embodiment of a portable flare system of the present invention which incorporates optional switching apparatus to automatically turn fares on when removed from the carrying case and/or turn flares off when reattached to the carrying case.
Figure 12:
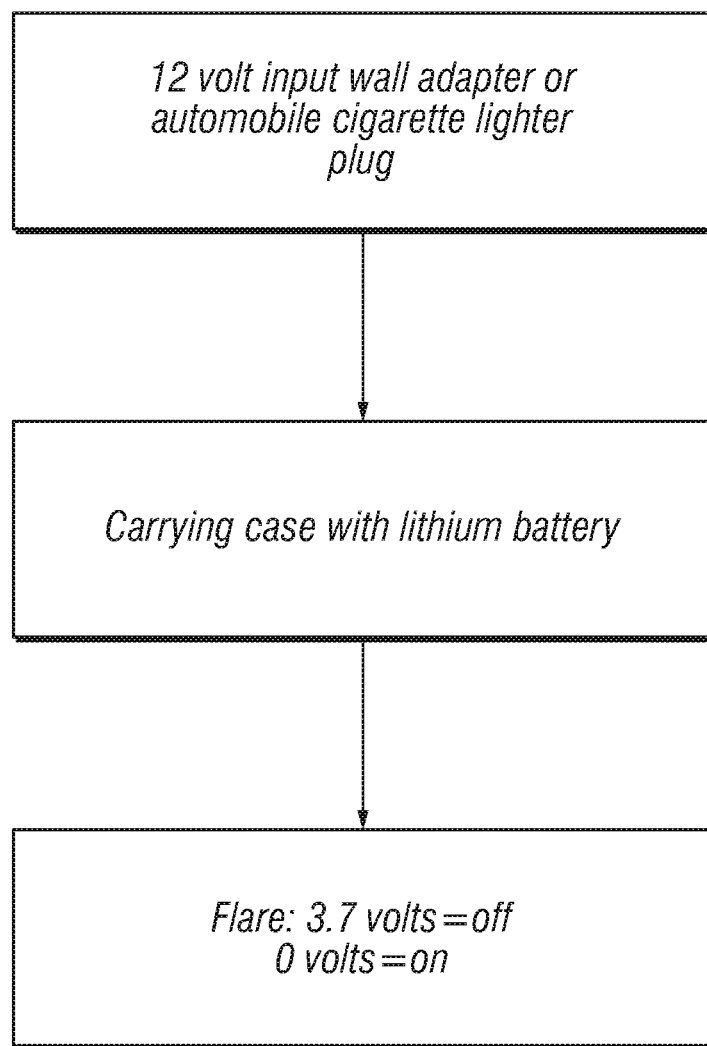
FIG. 12 is a block diagram illustrating steps in a method for using a portable flare system of the present invention which incorporates an optional rechargeable power source and optional switching apparatus to automatically turn flares on when removed from the carrying case and/or turn flares off when reattached to the carrying case.

Another example, as shown in FIGS. 10 and 10A, is a laser emitter to project laser light 46 onto a road or other surface to create an illuminated line or other pattern useable as a guide for placement of the flares 14 in a straight row or other desired configuration. The laser emitter 44 may be powered by a power source 42 such as a battery within the case or by a wired connection of the case 12g to a power outlet located in a nearby vehicle or structure. The laser emitter 44 may be turned on and off, or turned on and then automatically turn off after a timed period such as 10 minutes, for example.

In embodiments that incorporate one or more of the novel functional features described above, the flare carrying case may be more than a passive device used solely for mobility, but rather may be an active device providing for charging of the flares, control/communication, positional and/or optical alignment of flares, assisted deployment, placement and/or retrieval of flares and/or automatic turning on or actuation of the flares as they are removed from the case.

It is to be appreciated that, although the invention has been described hereabove with reference to certain examples or embodiments of the invention, various additions, deletions, alterations and modifications may be made to those described examples and embodiments without departing from the intended spirit and scope of the invention. For example, any elements, steps, members, components, compositions, reactants, parts or portions of one embodiment or example may be incorporated into or used with another embodiment or example, unless otherwise specified or unless doing so would render that embodiment or example unsuitable for its intended use. Also, where the steps of a method or process have been described or listed in a particular order, the order of such steps may be changed unless otherwise specified or unless doing so would render the method or process unsuitable for its intended purpose. Additionally, the elements, steps, members, components, compositions, reactants, parts or portions of any invention or example described herein may optionally exist or be utilized in the absence or substantial absence of any other element, step, member, component, composition, reactant, part or portion unless otherwise noted. All reasonable additions, deletions, modifications and alterations are to be considered equivalents of the described examples and embodiments and are to be included within the scope of the following claims.

What is claimed is:

1. A carrying case for electronic flares comprising:
   a case body having an exposed surface;
   a plurality of flare holding positions on the exposed surface; and
   a handle;
   wherein the handle, exposed surface and the flare holding positions are configured such that a user may rasp the handle and carry the carrying case while at least one flare is mounted at at least one of said flare holding positions while said at least one flare is emitting light visible at locations outside of the carrying case.

2. A carrying case according to claim 1 wherein each flare holding position comprises at least one flare locator which guides placement of a flare at that flare holding position and at least one releasable attachment member which releasable holds a flare in place at that flare holding position.

3. A carrying case according to claim 2 wherein said at least one flare locator comprises a cavity, depression, ridge, rib, bump, registry surface, guide member or other structure or device configured to guide the vertical positioning, horizontal positioning and rotational orientation of the flare when place at that flare holding position.

4. A carrying case according to claim 2 wherein said at least one releasable attachment member comprises a magnet, hook, pin, fastener, adhesive, hook & loop material; bayonet fixture, friction fit rim or other apparatus for releasably holding the flare in place at that flare holding position.

5. A carrying case according to claim 1 wherein the flare holding positions hold the flares such that flares positioned in the flare holding positions may emit light that is visible outside of the carrying case.

6. A carrying case according to claim 1 wherein the flare holding positions are configured to hold flares having general shapes selected from: rectangular, rectangular with rounded corner, round, oval, ovoid, polygonal and star-like.

7. A carrying case according to claim 1 wherein said exposed surface is substantially flat.

8. A carrying case according to claim 1 wherein the case has exposed front and rear surfaces and the flare holding positions are located on only one of said front surface and rear surfaces.

9. A carrying case according to according to claim 1 wherein the case has exposed front and rear surfaces and the flare holding positions are located on both the front surface and the rear surface.

10. A carrying case according to claim 1 further comprising apparatus and circuitry for charging rechargeable flares when positioned in the flare holding locations.

11. A carrying case according to claim 10 wherein the apparatus and circuitry for charging comprises a power source which delivers electrical current to case electric contacts located at said flare holding positions.

12. A system comprising a carrying case according to claim 11 in combination with electrically chargeable flares positionable on the case at said flare holding positions, said electrically chargeable flares having flare charging electrical contacts that engage the case electrical contacts to deliver electrical current from the power source to the chargeable flares when positioned on the case at said flare holding positions.

13. A system comprising a carrying case according to claim 1 in combination with flares that are attachable to and removable from the flare holding positions, wherein the flares automatically turn on or actuate upon removal from the flare holding positions.

14. A system comprising a carrying case according to claim 1 in combination with flares that are attachable to and removable from the flare holding positions, wherein the case further comprises a remote controller for controlling the flares.

15. A system according to claim 14 wherein the remote controller comprises a radio transceiver which communicates with the flares, a microcontroller and a user interface.

16. A system comprising a carrying case according to claim 1 in combination with flares that are attachable to and removable from the flare holding positions, wherein the case further comprises or contains apparatus useable to guide or facilitate deployment of the flares.

17. A system according to claim 16 wherein the apparatus useable to guide or facilitate deployment of the flares is selected from: elongate members, elongate members with flare locations indicators at spaced-apart locations thereon, elongate members with apparatus for attaching or connecting flares thereto at spaced-apart locations thereon, light emitters that emit light to illuminate a line or pattern on a surface where flares are to be placed, laser light emitters that emit laser light to illuminate a line or pattern on a surface where flares are to be placed.

18. A system according to claim 17 wherein the apparatus useable to guide or facilitate deployment comprises a reeling device and tether.

19. A system according to claim 18 wherein the tether has apparatus for attaching the flares to the tether at spaced-apart locations on the tether.

20. A method for signaling the position of an individual who is carrying a carrying case according to any of claims 1 through 16, said method comprising:
   causing at least one flare to be mounted in at least one of said flare holding positions; and
   causing the at least one flare mounted in the carrying case to emit light visible at locations outside of the carrying case while said individual is carrying the carrying case, thereby signaling the position of said individual while carrying the carrying case.

21. A system comprising a carrying case according to claim 1 in combination with a plurality of electronic flares mounted at said plurality of flare holding positions, said system further comprising at least one element selected from:
   apparatus useable for causing the flares to automatically turn on or become active upon removal from the case;
   apparatus useable for delivering electrical charge to the flares while the flares are positioned on or in the case;
   apparatus useable for facilitating deployment and/or retrieval of the flares; and
   apparatus useable for remotely controlling the flares.

* * * * *